March 21, 1961  A. E. MOULTON ET AL  2,975,621
UNIVERSAL JOINTS AND COUPLINGS
Filed June 1, 1959  3 Sheets-Sheet 1

INVENTORS
ALEXANDER ERIC MOULTON
BY ALEXANDER ARNOLD ISSIGONIS

Shoemaker + Mattare

ATTORNEYS

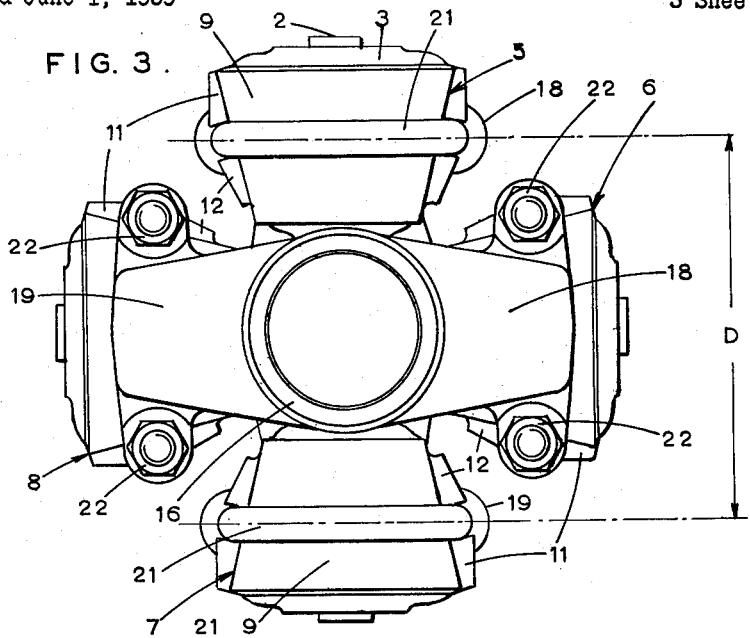
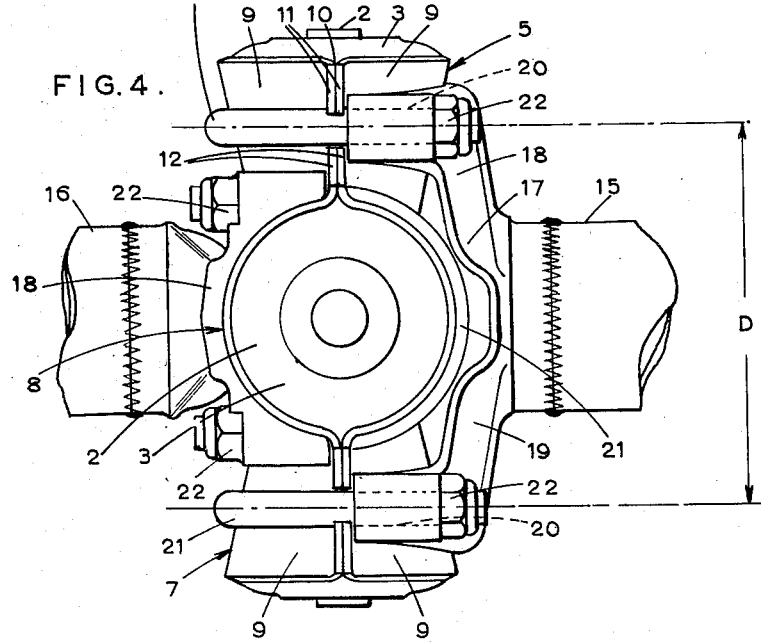

March 21, 1961    A. E. MOULTON ET AL    2,975,621
UNIVERSAL JOINTS AND COUPLINGS
Filed June 1, 1959    3 Sheets-Sheet 3

INVENTORS
ALEXANDER ERIC MOULTON
ALEXANDER ARNOLD ISSIGONIS
BY
*Shoemaker & Mattare*

ATTORNEYS

# United States Patent Office 2,975,621
Patented Mar. 21, 1961

2,975,621
UNIVERSAL JOINTS AND COUPLINGS

Alexander Eric Moulton, Bradford-on-Avon, and Alec A. Issigonis, Oxford, England, assignors to Moulton Developments Limited, Bradford-on-Avon, England, a British company Filed June 1, 1959, Ser. No. 817,096
Claims priority, application Great Britain June 6, 1958
14 Claims. (Cl. 64—17)

This invention relates to universal shaft couplings of the Hooke's joint type in which rubber bushes are used on the radial pivots disposed at the ends of yokes carried by the shafts to be connected.

According to the invention a universal shaft coupling of the Hooke's joint type comprises a spider having four mutually perpendicular limbs, a frusto-conical rubber bush bonded to each limb with its thicker end outermost, a frusto-conical shell surrounding each bush, and means for securing the shells of opposite bushes to the yokes carried by the shafts to be connected, the bushes being compressed radially on to the limbs of the spider on assembly of the coupling.

In one manner of carrying the invention into effect compression of the bushes is obtained by splitting the shells longitudinally and by pressing the separate parts of the shells together transversely. In one embodiment of the invention the part-shells are metallic castings of substantial thickness. The part-shells are pressed together and at the same time secured to the yokes by a pair of bolts engaging aligned apertured lugs disposed at the longitudinal edges of the part-shells.

The present invention also provides an improved coupling employing split shells in which assembly of the coupling is facilitated, and in which the weight of the coupling is reduced to a minimum consistent with adequate strength.

According to this aspect of the present invention, in a universal shaft coupling each shell is split longitudinally and is compressed radially by a single U-shaped bolt, the bend of which embraces one of the halves of the shell and the arms of which co-operate with lugs on the shell and with holes in a yoke carried by one of the shafts to be coupled and receive nuts which are adapted to bear on the yoke.

According to a further feature of the present invention, each half of each shell is formed by pressing or stamping from a metal plate and having at each end of its longitudinal edges a pair of spaced radially directed lugs integral therewith. At least one of the halves of each shell may be provided with a circumferential groove for co-operation with one of said U-shaped bolts.

The rubber bushes may be additionally compressed on assembly of the coupling by outward displacement of the shells relative to the limbs of the spider. In this case the provision of U-shaped bolts is particularly advantageous for facilitating assembly.

The bore of each rubber bush may be cylindrical but is preferably tapered in the same direction as, but to a lesser degree than, the external conical surface of the bush, the limb of the spider being correspondingly tapered. The tapered bore is particularly desirable in the case where the bush is compressed by outward axial displacement of the shell.

Two embodiments of the invention will now be described, by way of example, with reference to the accompanying drawings, in which:

Figures 3 and 4 are views in end and side elevation, respectively, of an assembled shaft coupling embodying the coupling spider of Figures 1 and 2.

Figure 1:
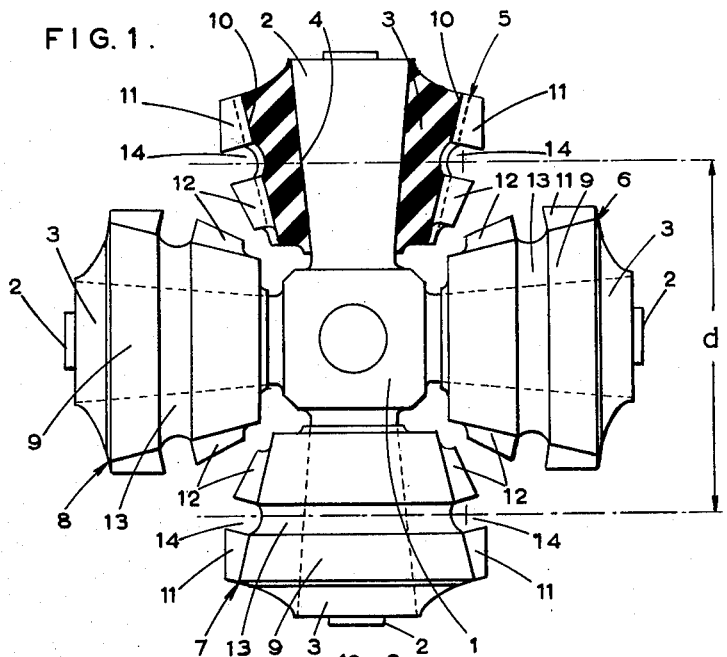
Figure 1 is an elevational view partly in section of a coupling spider according to one embodiment.
Figure 2:
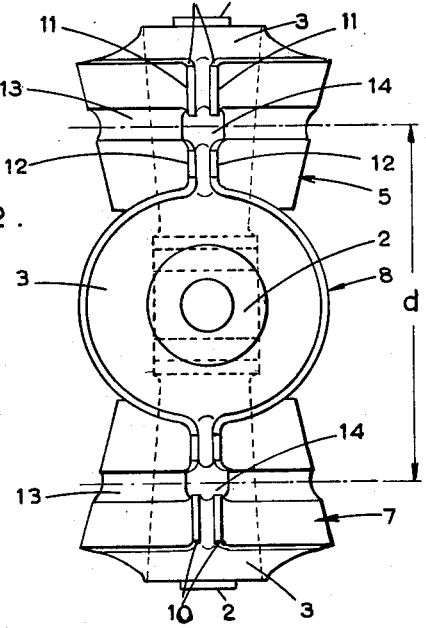
Figure 2 is a view in end elevation of the coupling spider of Figure 1.

Referring now to the drawings but firstly to Figures 1 and 2, the spider comprises a hub 1 and four mutually perpendicular limbs 2. A frusto-conical rubber bush 3 is bonded to each limb with its thicker end outermost. The bush has a tapered bore 4, each limb 2 having a corresponding taper. The limbs 2 and bores 4 are tapered in the same direction as, but to a lesser degree than, the external surface of the bush, so that the bush increases gradually in thickness from its inner end to its outer end.

Frusto-conical metallic shells indicated generally at 5, 6, 7 and 8 are bonded to the external surfaces of the bushes 3. Each shell is split longitudinally to provide identical half-shells 9, the longitudinal edges 10 being slightly spaced apart as shown in Figure 2. Two spaced radial lugs 11 and 12 are provided at each longitudinal edge. Each half-shell has a shallow circumferential groove 13 which registers with the gap 14 between the lugs 11 and 12 and is of the same width as the gap 14.

Referring now to Figures 3 and 4, the driving shaft 15 and the driven shaft 16 carry identical yokes 17 by which the shaft 15 is connected to the shells 5 and 7 of opposite bushes and the shaft 16 is connected to the shells 6 and 8 of the other pair of bushes. The yoke 17 has a pair of forked arms 18 and 19, the inner periphery of each fork being shaped to correspond to the shape of a half-shell 9. The ends of each fork have holes 20 which are parallel to the axis of the respective shaft and which are adapted to receive the ends of a U-shaped bolt 21. The bend of the bolt 21 lies in a groove 13 and its arms pass through the gaps 14 and between the lugs 11 and 12. When nuts 22 are tightened on the ends of the bolt, the half-shells 9 are pressed together transversely until opposed pairs of lugs 11 and 12 are brought into contact, and the bushes 3 are compressed radially on to the limbs 2. It will be appreciated that as the half-shells 9 are identical, there will be a groove 13 for the reception of the bolt 21, whichever way the spider 11 is presented to a yoke during assembly of the coupling.

In the preferred embodiment of the invention illustrated the distance $d$ between the centres of the gaps 14 of the shell 5 and the centres of the gaps 14 of the shell 7 is less than the distance $D$ between the centres of the holes 20 of the forked arm 18 from the centres of the holes 20 of the forked arm 19. Consequently, it is necessary, during the assembly of the spider on the driving shaft 15, to pull the shells 5 and 7 apart by means of a suitable tool or tools until the gaps 14 of both shells register with the holes 20, so that the two U-shaped bolts may be passed through the gaps 14 and holes 20. The bushes are thus given an initial radial compression before they are further compressed by tightening the bolts 21. The shells 6 and 8 are initially the same distance apart as the shells 5 and 7, and they are similarly pulled apart to enable the spider to be connected to the driven shaft 16.

It is obvious that yokes may be provided for a particular spider in which the distance $D$ is equal to the distance $d$. In this event the bushes are only compressed radially on assembly by means of the split shells.

Figure 5:
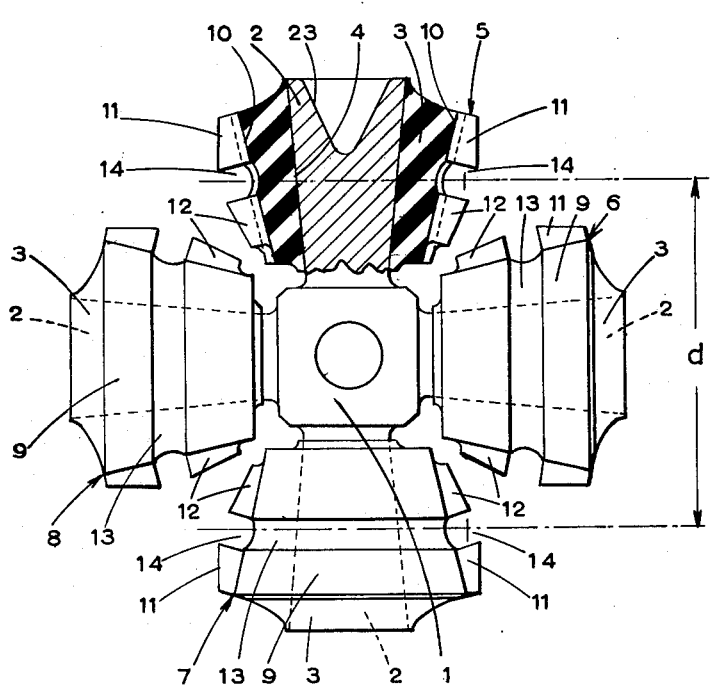
Figure 5 is a view similar to Figure 1 showing a modification.

It will be appreciated that the weight of the coupling employing shells comprising metal pressings or stampings as described above is reduced as compared with a coupling employing shells comprising metal castings. The weight of the coupling may be further reduced according to a preferred modification illustrated in Figure 5 wherein each of the limbs 2 of the spider is provided at its outer end with a recess 23. The modified coupling spider is otherwise identical with that shown in Figure 1 of the accompanying drawings.

It will be appreciated that although the rubber bushes have been described and shown as bonded directly to the limbs of the spider, such bushes could be bonded to intermediate sleeves adapted to fit over the limbs, means being provided to prevent rotation of the intermediate sleeves about such limbs.

The U-bolt 21 may advantageously be formed with shoulders which when the nuts are screwed home bear against the flanges of the forked arms, 18 and 19, of the yoke 17 thus pre-determining the degree of pre-compression to which the rubber bushes are subjected.

What we claim is:

1. A universal shaft coupling of the Hooke's joint type comprising a spider having four mutually perpendicular limbs, a frusto-conical rubber bush having a thicker end and a thinner end bonded to each limb with its thicker end outermost, a frusto-conical shell surrounding each bush, the bushes being unconfined at their outer ends, and means including U-shaped bolts for securing the shells of opposite bushes to the yokes carried by the shafts to be connected, the bushes being compressed radially on to the limbs of the spider on assembly of the coupling.

2. A universal shaft coupling of the Hooke's joint type comprising a spider having four mutually perpendicular limbs, a rubber bush bonded to each limb, a shell surrounding each bush, and means including U-shaped bolts for securing the shells of opposite bushes to yokes carried by the shafts to be connected, wherein the shells are split longitudinally and the bushes are compressed radially on to the limbs of the spider by the U-shaped bolts pressing the parts of the shells together.

3. A universal shaft coupling according to claim 1, wherein the bushes are compressed radially by outward axial displacement of the shells relative to the limbs of the spider.

4. A universal shaft coupling according to claim 1, wherein the bushes are compressed radially by the combined operations of outward axial displacement of the shells relative to the limbs of the spider and transverse compression of the shells.

5. A universal shaft coupling according to claim 1, wherein the bore of each bush is tapered in the same direction as, but to a lesser degree than, the external conical surface of the bush, the limb of the spider being correspondingly tapered.

6. A universal shaft coupling according to claim 1, wherein the bore of each bush is tapered in the same direction as, but to a lesser degree than, the external conical surface of the bush, the limb of the spider being correspondingly tapered, and wherein the bushes are compressed radially by splitting the shells longitudinally and by pressing the separate halves of the shelves together transversely.

7. A coupling spider for a universal shaft coupling comprising four mutually perpendicular limbs, a frusto-conical rubber bush bonded to each limb with its thicker end outermost, a longitudinally split frusto-conical shell bonded to the external surface of each bush, the longitudinal edges of the halves of the shell being spaced apart, and means on each half of the shell for co-operation with U-shaped bolts or the like for pressing the halves of the shell together transversely.

8. A universal shaft coupling according to claim 2, wherein each shell is split longitudinally and is compressed radially by a single U-shaped bolt, the bend of which embraces one of the halves of the shell and the arms of which co-operate with lugs on the shell and with holes in a yoke and receive nuts which are adapted to bear on the yoke.

9. A universal shaft coupling according to claim 8, wherein at least one of the halves of each shell is provided with a circumferential groove for co-operation with one of the said U-shaped bolts.

10. A universal shaft coupling according to claim 2, wherein each of the limbs of the spider is recessed at its outer end.

11. A universal shaft coupling according to claim 2, wherein the U-bolts are formed with shoulders co-operating with nuts of the bolts to predetermine the degree of pre-compression to which the rubber bushes are subjected.

12. A universal shaft coupling of the Hooke's joint type comprising a spider having four mutually perpendicular limbs, a frusto-conical rubber bush having a thicker end and a thinner end bonded to each limb with its thicker end outermost, a frusto-conical shell surrounding each bush, and means compressively engaging each shell upon a corresponding bush, each shell being formed of complemental half sections having their longitudinal edges provided with radially projecting lugs presenting a gap therebetween substantially midway between the opposite ends of each such half section, the wall of each section being inwardly deformed circumferentially from one such gap to the other to define circumferentially extending arcuate grooves deforming the walls inwardly to be embedded within a respective bush.

13. The assembly as defined in and by claim 12 wherein said means for holding the sections together comprises in each instance a U-bolt having the bight portion thereof received in the arcuate groove of one of said half sections and with the legs thereof passing through the gaps between the lugs of each section.

14. The assembly as defined in and by claim 13 wherein there is a yoke associated with each diametrically opposed pair of half sections, each yoke having a pair of arms engaging a half section of each opposed pair of half sections and being provided with apertured portions receiving the legs of said U-bolts, the distance between corresponding apertures in each such pair of arms being greater than the spacing between the notches and grooves of the corresponding pairs of half sections whereby insertion of the U-bolts requires separation of the diametrically opposed pairs of half sections to thereby preload the bushes.

References Cited in the file of this patent

UNITED STATES PATENTS

| 1,748,486 | Lord | Feb. 25, 1930 |
| 1,768,759 | Harris | July 1, 1930 |
| 1,997,488 | Henery | Apr. 9, 1935 |

FOREIGN PATENTS

| 496,896 | Great Britain | Dec. 8, 1938 |